Nov. 17, 1959     J. H. BOOTH     2,913,268
BALL BEARING BALL JOINT
Filed July 10, 1956
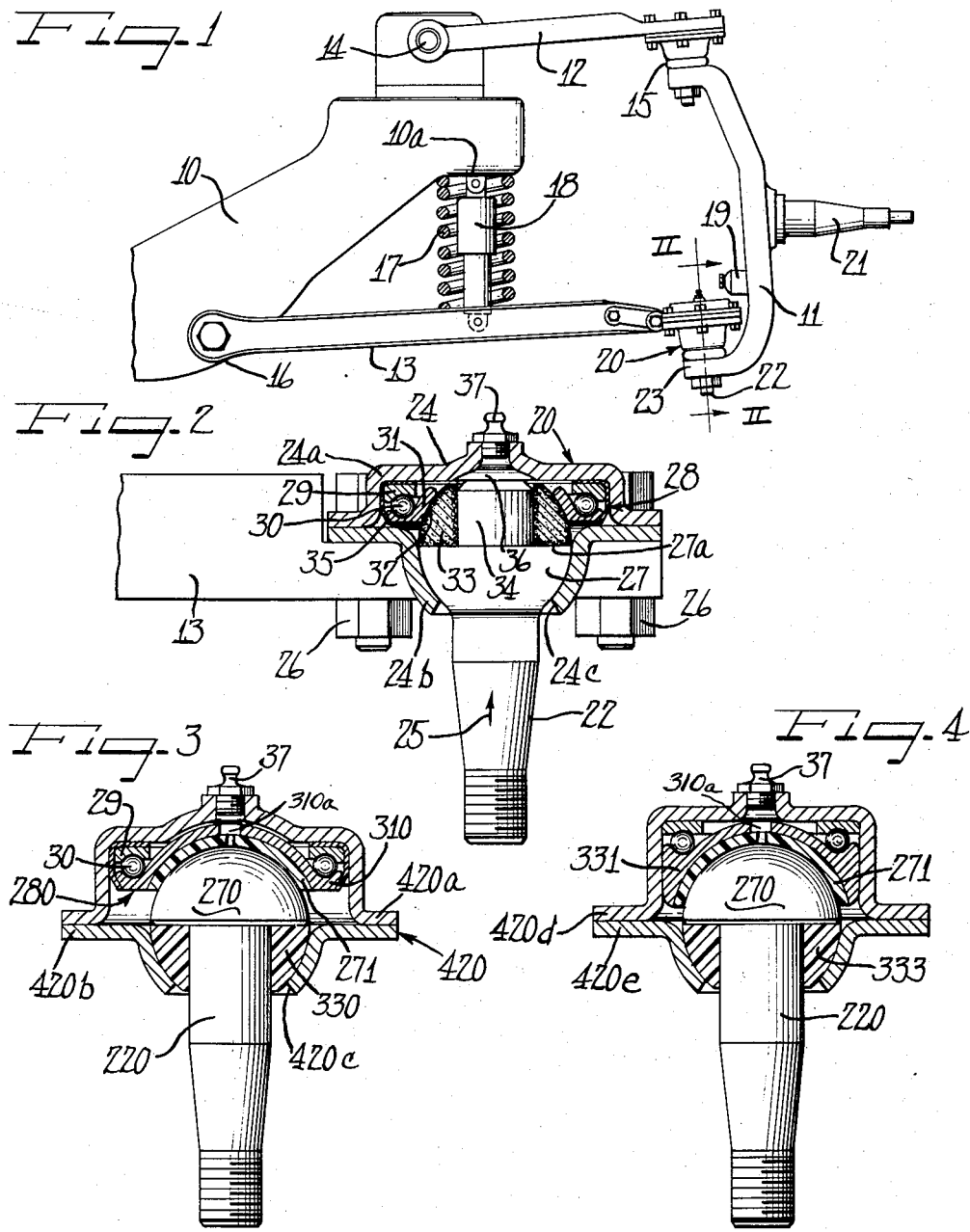
Inventor
James H. Booth
by Hill, Sherman, Meroni, Gross & Simpson Attys

United States Patent Office 2,913,268
Patented Nov. 17, 1959

2,913,268

BALL BEARING BALL JOINT

James H. Booth, Detroit, Mich., assignor to Thompson Ramo Wooldridge Inc., a corporation of Ohio Application July 10, 1956, Serial No. 596,862

2 Claims. (Cl. 287—90)

The present invention relates to a ball joint construction and is, more particularly, concerned with the provision of a novel and improved ball-type universal joint of the compression-loaded variety.

Since the advent of independent wheel suspensions for automotive vehicles a major consideration in the successful operation of such systems has been the perfection of durable pivot joints having high bearing efficiencies. One of the most important contributions in recent years has been the provision of such independent front wheel suspensions incorporating a wheel support spindle which is universally pivotally mounted by means of spaced upper and lower ball joints to respective upper and lower pivotally mounted control arms. In such systems the substantially vertical king pin used in prior steering systems has been eliminated and the upper and lower ball joints assume the function of providing for pivotal motion about the substantially vertical axis as in steering; and about the substantially horizontal axis as in vertical movement of the wheel spindle relative to the vehicle frame.

The present invention specifically relates to an improved construction of a ball joint for use in independent suspensions of the type employing upper and lower spaced universal ball joints rather than the earlier king pin arrangement. In accordance with the present invention an exceptionally compact universal ball joint is provided which is capable of heavy loading under compression. At the same time, compactness is achieved without in any way reducing the efficiency of the universal joint. In fact, through the utilization of ball bearings in the manner prescribed by the present invention greater steering efficiency is provided than in prior art constructions of the compression loaded type. In addition, expense is reduced by the provision of sheet metal joint components and self-lubricating plastic materials such as the high molecular weight polyamides, such as "nylon" or polyethylene are provided for permitting essentially anti-friction rotation of the joint while pivoting of the joint in upward and downward direction relative to the frame.

In accordance with the principles of the present invention, a universal type ball joint stud is provided in a sheet metal socket conforming generally with the outline of the ball. Preferably, the ball is cradled within a ball bearing such that the surface of the ball supports the inner race of the ball bearing and the sheet metal outer housing of the joint supports the outer race of the bearing. By providing the bearing in a position to substantially overlap the ball of the stud, the anti-friction characteristics of the ball bearing are achieved without in any way increasing the length of the ball joint-stud assembly. As a result of this arrangement rotation about the axis of the ball joint stud is accomplished freely and in an anti-friction manner. In further accordance with the preferred embodiments of the present invention a plastic member is positioned between the metal of the stud proper and the ball bearing anti-frictionally supporting the compression load. A plastic, such as the high molecular weight polyamide or polyethylene resins, which have self-lubricating qualities and hence are capable of operation with a minimum of external lubrication, is preferably utilized for this purpose, as will more fully be set forth below.

In further accordance with the principles of the present invention the ball bearing structure preferably utilized essentially surrounds the ball of the ball stud rather than being placed within the confines thereof or directly thereabove. As a result, the space requirements of the present ball joint are substantially minimized and a smaller ball stud ball may effectively be utilized without unduly limiting the size of the ball bearings or enlarging the outer joint casing.

It is, accordingly, an object of the present invention to provide a novel and substantially improved ball bearing universal ball joint of simple construction and capable of carrying heavy vehicle loads.

Another object of the present invention is to provide a compact universally tiltable ball joint of the compression type and which incorporates ball bearing support for rotary movement.

Still a further object of the present invention is to provide an improved ball bearing ball joint of the universally tiltable type wherein compression bearing loads are more evenly applied to the ball bearing race than has heretofore been considered possible.

A feature of the invention resides in the utilization of a bearing race construction wherein the ball bearings are positioned laterally of the ball stud, rather than axially thereof.

Still a further feature of the invention resides in the utilization of a self-lubricating plastic material between the segmental spherical ball joint surface of a ball stud and the race or carrier of an anti-friction ball bearing assembly used for assuring complete anti-friction rotation of the ball joint stud about its own longitudinal axis under compression loads.

Yet another feature of the present invention is the utilization of self-lubricating plastics in conjunction with a compression loaded ball stud to provide an increased effective ball stud bearing area and to minimize needed lubrication of the joint.

Still other and further objects and features of the present invention will at once occur to those skilled in the art from a consideration of the attached drawings wherein several preferred embodiments of the present invention are shown by way of illustration only, and wherein:

Figure 1 is a fragmental end elevation of an automotive independent wheel suspension embodying a ball joint constructed in accordance with the principles of the present invention;

Figure 2 is a cross-sectional view taken along the line II—II of Figure 1 illustrating the internal construction of a preferred embodiment of the ball joint of the present invention;

Figure 3 is a modified form of the invention shown in Figure 2, likewise in cross-section; and Figure 4 is a second modified form of the ball bearing ball joint constructed in accordance with the present invention, shown in cross-section.

As shown on the drawings:

As may be seen from consideration of Figure 1, the present invention finds particular adaptation in suspension systems for automotive vehicles. As there shown, the front vehicle frame 10 supports a front wheel steering knuckle 11 by means of upper and lower wishbone control arms 12 and 13 respectively. The upper control arm is pivoted at its inboard end to the frame 10, as at 14 and is connected to the upper end of the steering knuckle 11 by means of a universal ball joint 15. Likewise, the lower control arm 13 is pivotally secured to the frame 10 at 16 and to the steering knuckle 11 at the load carrying universal joint 20. The weight of the vehicle is carried mainly by the lower control arm 13 as will be seen from the positioning of the spring 17 between the control arm 13 and the ledge 10a of the frame 10. A conventional direct acting shock absorber 18 may be provided between the frame and the control arm 13 to provide vibration damping action for the system in the conventional manner.

In the structure as above set forth, the load placed on the steering knuckle 11 by a wheel (not shown) rotatably mounted on the spindle 21, is imparted to the ball joint 20 by means of ball stud 22 rigidly secured to the steering knuckle 11 at boss 23. As a result of this arrangement, the load on the joint 20 acts to compress the stud 22 against the joint housing 24, as shown in Figure 2. This load application, in the direction of arrow 25 places the joint within the class ordinarily termed "compression loaded."

As may be seen more clearly from a consideration of the enlarged view in Figure 2, the joint 20 is constructed with a sheet metal housing 24 comprising, in turn, an upper sheet metal cup 24a and a lower sheet metal cup 24b. Cups 24a and 24b are secured to each other and to the lower control arm 13 by means of fastening bolts 26. As may be seen, the vertical thickness of the overall housing 24 is substantially the same as the diameter of the generally spherical portion 27 of the ball stud 22. This is accomplished in accordance with the present invention by providing a ball bearing generally indicated at 28 in the form shown. Thus, the outer bearing race 29 sits in the upper housing cup 24a in a position substantially outside the peripheral dimension of the ball 27. The race 29 cooperates with balls 30 and an inner race 31 having a segmental spherical surface 32 adapted for contact with the segmental spherical surface of the annular bearing ring 33 carried on a cylindrical pilot bearing 34 of the stud 22.

As will be seen from Figure 2, the diameter of the ball bearings 30 is relatively independent of the size of the stud ball 27. This is true since the balls need not be within the confines of the stud ball and, further, need not be positioned within an area equal to the diameter of the ball. As a result, the ball bearings 30 may readily be designed to carry the full compression load of the vehicle wheel substantially independently of the specific diameter and loading of the stud 22 itself. Further, by placing the balls 30 on a diameter greater than the diameter of the stud ball 27, the load applied to the housing 24 by the stud 22 will be absorbed by a substantially greater number of balls than would be provided if the balls were positioned within the general confines of the stud ball 27. This construction permits the load concentrations within the ball bearing 28 to be minimized, thereby greatly increasing the expected life of the bearing. In the embodiment shown in Figure 2, the bearing is maintained in assembled relation by a thin sheet metal outer casing 35 which is loosely spun over the inner bearing race 31. Grease is supplied to the bearing 28 by means of the reservoir 36 which is in turn supplied by means of a grease fitting 37.

In the form illustrated in Figure 2, the annular bearing ring 33 is preferably constructed of a self-lubricating rigid material, such as, for example, powdered iron case hardened at its outer surface and impregnated with lubricant. This material operates satisfactorily with a minimum of service lubrication. As a result of this cooperation, loads are evenly transmitted from the ball stud 22 to the inner bearing race 31 via the stud ball shoulder 27a and the ring 33. Such loads are transmitted evenly to the inner bearing race 31 independently of the tilt angle of the stud 22 relative to the plane of the bearing races and accordingly a smooth bearing action is provided between the bearing race 31 and the stud 22 under all conditions of limited pivotal movement permitted by the opening 24c in the housing 24. Rotational move-ment of the stud 22 is accommodated by the ball bearing 28 and is also facilitated by the anti-friction bearing connection between the annular ring 33 and the surface 27a. In the event of failure of the ball bearings 30, for any cause whatever, complete bearing action will be accommodated by the bearing ring 33. Under such circumstances of ball bearing failure, the outer surface of the bearing ring 33 will slidably contact the inner race 31 while the inner cylindrical bore of the ring 33 will cooperate with the stud pilot 34 to provide for rotation of the stud. While such action is not, of course, contemplated in ordinary operation since the anti-friction bearing characteristics of the balls 30 are better than the direct metal-to-antifriction metal contact between the stud 22 and the ring 33, nevertheless the structure as shown provides a ball stud which is safe for steering even if the ball bearings should fail.

In the embodiment of the invention illustrated in Figure 3, the relationships of the internal parts of the joint are somewhat modified. Thus, the stud 220 has the ball head 270 thereof in direct load transmitting contact with a self-lubricating plastic liner 271 which is interposed between the head 270 and the inner race 310 of the ball bearing assembly 280. As shown, the race 310 forms a substantially semi-spherical cup providing a substantially larger overall bearing surface between the stud head 270 and the race 310 than in the form shown in Figure 2. The outer race 29 and the balls 30 are essentially the same in the embodiment shown in Figure 3 as in the corresponding structure of Figure 2. Likewise, the housing 420 is essentially the same as housing 42 of Figure 2, with the exception that the housing portion 420a is slightly greater in height in order to accommodate the semi-spherical bearing cup 310.

In addition to the modifications above discussed, the form of the invention shown in Figure 3 utilizes a bearing ring 330 of self lubricating plastic, such as, for example, polyethylene or the high molecular weight polyamides, between the stud 220 and the bottom portion 420a of the housing 420. Actual bearing loads in the compression condition are not carried by the plastic bearing ring 330. However, during periods in which the joint acts in tension, as occurs when the vehicle wheel is returning to its normal position after leaving a bump, the ring 330 provides a bearing permitting the efficient rotation of the stud 220. Additionally, the plastic ring 330 provides a very satisfactory seal for the aperture 420c. As in the case of the embodiment shown in Figure 2 grease is introduced into the housing by means of a grease fitting 37. In view of the substantially complete semi-spherical shape of the bearing race 310, a small aperture 310a is provided to permit the flow of lubricant under pressure to the plastic for the initial lubrication thereof.

In the further embodiment shown in Figure 4, the basic construction as shown in Figure 3 is employed. Thus, housing components 420d and e enclose a stud 220 having an enlarged head 270 rotatably mounted in a plastic bearing ring 333. A plastic cup-shaped member 271 is positioned in contact with the stud head 270 and cooperates with a modified bearing race 331. The race 331 is similar to the race 310 above described except that it has its external periphery in bearing relation with the inner cylindrical wall 332 of the housing cup 420a. This relationship prevents any lateral shifting whatever of the bearing race 331 and accordingly, brake loads applied to the steering knuckle 11, or other laterally applied loads which occur during vehicular motion, are transmitted directly to the housing 420e without passing through the ball bearing assembly. This places the ball bearing in a condition adapted to absorb solely thrust loads. In extremely heavy duty installations, such as for example in trucks where heavy braking loads are encountered, the removal of lateral thrust loads from the ball bearings prevents undue wear of the bearings and minimizes lateral play in the overall joint. In other respects, the drawing shown in Figure 4 is essentially the same as that shown in Figure 3.

It will thus be seen that I have provided a novel and extremely compact ball joint in which anti-friction ball bearing means are provided. The ball bearings as used in the present invention are in no way limited in size or number by the actual diameter of the ball of the stud itself and, further, do not project any higher than the stud itself. This structural relationship permits the utilization of the stud of the present invention in compression locations, such as shown in Figure 1, without interfering with steering parts, such as for example the steering arm 19 ordinarily positioned directly above the lower ball joint. Further, the actual size of the ball joint stud is not dictated by the ball bearing loads.

Further, in accordance with the principles of the present invention, a self-lubricating plastic bearing of a slightly yieldable type is provided in certain forms of the joint in cooperation with the ball bearing to provide a spreading of the ball joint loads over the entire ball bearing race area at all times, independently of the degree of tilt of the ball joint. The utilization of this plastic material permits anti-friction tilting of the ball as well as rotation thereof and provides an overall joint of substantially superior characteristics.

It will, of course, be apparent to those skilled in the art that variations and modifications may be made in accordance with the present invention without departing from the scope of the novel concepts thereof. Accordingly, it is my intention that the scope of the present invention be limited solely by that of the hereinafter appended claims.

I claim:

1. In combination in a universal ball joint, a housing, a segmental spherical bearing surface in said housing, an aperture in said surface, a stud having a shank extending through said aperture, a head on said stud positioned in said housing, a segmental spherical bearing surface on said stud head slidably bearing against said segmental spherical surface in said housing, a first annular bearing race positioned in said housing opposite said aperture and secured to the end wall of the housing opposite said aperture and facing axially of the axis of said aperture, a second annular ball bearing race, a plurality of anti-friction ball bearings positioned between said bearing races, means mounting said second race for universal tilting movement relative to said stud head, said races having a diameter greater than said stud head and providing a circular path for said anti-friction ball bearings and transferring loads applied to the stud substantially axially against the end face of the housing, and a self-lubricating plastic member positioned between said stud head and said second bearing race to evenly and anti-frictionally distribute the load from the second race to the stud head.

2. In combination in a universal ball joint, a housing formed of an upper and a lower part, means for securing said parts together, a segmental spherical bearing surface in the lower part of said housing, an aperture in said surface opening from said lower part, a stud having a shank extending through said aperture to receive an external load in the direction of said upper part and having a head in said housing, a segmental spherical bearing surface on said stud head slidably bearing against said segmental spherical surface in said housing, a first annular ball bearing race mounted non-yieldingly in the upper part of said housing opposite said aperture and facing axially of the axis of said aperture, a second ball bearing race, a plurality of ball bearings positioned between said races, and a self-lubricating member positioned between said second race and said stud head for universal tilting movement of said stud head relative to said second race and to evenly and anti-frictionally distribute the load from the second race to the stud head, said races having a diameter greater than said stud head and located below the upper end of said stud head providing a circular path for the balls of a diameter greater than said stud head and substantially within the axial length of said stud for transferring forces applied to the stud axially to the first annular ball bearing race and thence axially to the end wall of the housing opposite said aperture.

References Cited in the file of this patent

UNITED STATES PATENTS

| | | |
|---|---|---|
| 2,037,786 | Hufferd | Apr. 21, 1936 |
| 2,461,626 | Booth | Feb. 15, 1949 |
| 2,471,672 | Booth | May 31, 1949 |
| 2,494,739 | Booth | Jan. 17, 1950 |

FOREIGN PATENTS

| | | |
|---|---|---|
| 1,049,045 | France | Aug. 12, 1953 |